United States Patent [19]

Zaima et al.

[11] Patent Number: 6,117,543

[45] Date of Patent: Sep. 12, 2000

[54] REACTIVE PARTICLES AND PROCESS FOR THE PRODUCTION THEREOF

[75] Inventors: Hiroaki Zaima; Hajime Kambara; Tak Yuen Chow; Kazuyuki Sato, all of Kyoto, Japan

[73] Assignee: KRI International, Inc., Osaka, Japan

[21] Appl. No.: 09/101,324

[22] PCT Filed: May 26, 1997

[86] PCT No.: PCT/JP97/01748

§ 371 Date: Jul. 7, 1998

§ 102(e) Date: Jul. 7, 1998

[87] PCT Pub. No.: WO98/20081

PCT Pub. Date: May 14, 1998

[30] Foreign Application Priority Data

Nov. 7, 1996 [JP] Japan .................................. 8-295450

[51] Int. Cl.$^7$ ........................................................ C03B 8/02
[52] U.S. Cl. ........................ 428/332; 428/403; 428/457; 428/688
[58] Field of Search .................... 428/332, 403, 428/457, 688

[56] References Cited

U.S. PATENT DOCUMENTS 5,304,243  4/1994  Yamaguchi et al. .................... 106/490

FOREIGN PATENT DOCUMENTS 2-22347  1/1990  Japan .
4-31459  2/1992  Japan .
6-49204  2/1994  Japan .
6-184224  7/1994  Japan .

OTHER PUBLICATIONS

Dewert Abstract No. 91–130220, dated Mar. 26, 1991.
Dewert Abstract No. 89–181493, dated May 11, 1989.

*Primary Examiner*—William Krynski
*Assistant Examiner*—B. Shewareged
*Attorney, Agent, or Firm*—Pillsbury, Madison & Sutro, LLP

[57] ABSTRACT

A carrier particle (A) is previously treated with a compound (B) such as a silane coupling agent, if necessary. To the carrier particle, a free functional group is introduced by allowing a reactive group of the carrier particle (A) to react with a compound (C) such as a bisoxazoline compound. As a result, a reactive particle represented by the following formula (I):

$$[C-(B1)_m]_n-A-[(B2)_p-D]_q \qquad (I)$$

wherein A is a carrier particle, C is an organic group having at least one free functional group, D is a hydrophilic or hydrophobic group, B1 is an organic group connecting the carrier particle A to the organic group C and B2 is an organic group connecting the carrier particle A to the hydrophilic or hydrophobic group; n is an integer of not less than 1, m and p are 0 or 1, q is 0 or an integer of not less than 1, m and p may be different according to n and q; and having a number of active sites can be obtained. A hydrophilic or hydrophobic group may be introduced to the carrier (A).

6 Claims, No Drawings

REACTIVE PARTICLES AND PROCESS FOR THE PRODUCTION THEREOF

This application is the national phase of international application PCT/JP97/01748, filed May 26, 1997 which designated the U.S.

TECHNICAL FIELD

The present invention relates to reactive particles useful as a filler or additive for a resin or resin composition, an additive or crosslinking agent for a paint composition, a viscosity-control agent, a resist material, a carrier used in a medicine, an additive for a cosmetic, etc., and the method for producing the same.

BACKGROUND ART

It is known that various particulate substances such as organic particulate substances (e.g. thermoplastic resins such as methacrylate and polystyrene which may be crosslinkable, thermosetting resins such as silicone resin) or inorganic particulate substances (e.g. silica, mica, talc, diatomaceous earth, calcium carbonate, silicon oxide, aluminumoxide, titanium oxide, aluminum hydroxide, etc.) are added, as an additive or filler, to a resin composition or paint composition in order to improve the characteristics of molded articles or coating layers. However, when the affinity between such a particulate substance and a resin deteriorates, the mechanical strength of the molded articles or coatings also deteriorates considerably. As a result, the species of a particulate substance is greatly restricted by the species of a resin to be used.

A particulate substance treated with a surface-treating agent has also been used to improve the affinity of the particulate substance. For example, there are known particulate substances such as particulate substances treated with resin, particulate substances treated with surface-treating agent, particulate substances treated with a surfactant, or the like. These particulate substances, however, are not reactive, and give limitation for improvements in mechanical and chemical properties of molded articles or coatings.

In Japanese Patent Application Laid-open No. 184224/1994, there is disclosed a method for producing reactive particles by reacting a polymer having a functional group containing an active hydrogen atom such as carboxyl group at an end or a side chain of a hydrophobic principal chain (e.g. modified olefinic polymers) with an oxazoline. Addition of a small quantity of such reactive particles obtained by this method to polymer compositions mutually incompatible is advantageous for obtaining a polymer alloy. The reactive particles recited in this reference, however, do not function well because of their relatively large particle size and being not containing many active sites.

Accordingly, an object of the present invention is to provide reactive particles each having a number of active sites and the method for producing the same.

An another object of the present invention is to provide reactive particles able to function effectively as a crosslinking agent or carrier even in small quantities.

A further object of the present invention is to provide reactive particles having high activity in spite of their being ultra-fine particulates each having a remarkably small mean particulate size.

DISCLOSURE OF INVENTION

The inventors of the present invention did intensive research, and finally found that a reactive particle having a number of active sites can be obtained by reacting a particulate carrier having a reactive group with a compound having a functional group such as bisoxazoline in order to introduce the functional group.

Namely, the reactive particle of the present invention is represented by the following formula (I):

$$[C\text{---}(B1)_m]_n\text{---}A\text{---}[(B2)_p\text{---}D]_q \qquad (I)$$

wherein A is a carrier particle, C is an organic group having at least one free functional group, D is a hydrophilic or hydrophobic organic group, B1 is an organic group connecting the carrier particle A to the organic group C, B2 is an organic group connecting the carrier particle A to the hydrophilic or hydrophobic organic group D, n is an integer of not less than 1, m and p are 0 or 1, q is 0 or an integer of not less than 1, and m and p may differ in accordance with n and q respectively.

The carrier particle A may be selected from organic or inorganic particles, for example, from polymers, metals, carbons, metal compounds, ceramics, etc. The free functional group of the organic group C may be an oxazoline group, a cyclic ester group, a cyclic ether group, an isocyanate group, a hydroxyl group, a mercapto group, a carboxyl group, an acid anhydride group, an ester group, an amino group, a formyl group, a carbonyl group, a vinyl group, a hydroxy-substituted silyl group, an alkoxyl-substituted silyl group, a halo-substituted silyl group, etc. Further, the hydrophilic or hydrophobic organic group D may be (1) an alkyl group, (2) an aryl group, (3) an aralkyl group, (4) a heterocyclic group, (5) an organic group selected from an alkyl group, an aryl group, an aralkyl group and a heterocyclic group, having at least one selected from an amide bond, an urethane bond, an urea bond and an ester bond, (6) a polyoxyalkylene group, (7) a saccharic or saccharide residue, etc. The organic groups B1 and B2 for connecting the carrier particle A to the organic group C or D may be residues of a silane coupling agent having a reactive group such as a halogen atom, a hydroxyl group, a mercapto, group, a carboxyl group, an amino group, an epoxy group, an isocyanate group, a vinyl group and a (meth)acryloyl group.

According to the method of the present invention, reactive particles are produced by allowing a particulate carrier (A) having a reactive group to react at least with a compound (C) having a free functional group together with a functional group which is reactive to the reactive group of the carrier, or with the compound (C) and a compound (D) having a hydrophilic or hydrophobic group together with a functional group reactive to the reactive group of the carrier.

In the present description, the carrier particle A may be simply referred to as "carrier (A)" or "carrier particle (A)". The organic groups B1 and B2 each connecting the carrier particle A to the organic group C or D may be referred to as "connecting organic group B" and "connecting organic group".

In the present description, "an organic group" means an atomic group having a linear, branched chain or cyclic carbon skeleton as a main skeleton, and at least one atom, besides carbon atom, selected from the group consisting of oxygen atom, nitrogen atom, sulfur atom, boron atom, silicon atom, phosphorus atom, metal atoms (titanium atom, germanium atom, tin atom, selenium atom, arsenic atom and antimony atom) at the main skeleton (main chain) or the side chain.

The meaning of the term "bond" includes a covalent bond, an ionic bond and a hydrogen bond.

BEST MODE FOR CARRYING OUT THE INVENTION

[Reactive particle]

A reactive particle is composed of a carrier particle (A) having a reactive group, and an organic group (C) having a free functional group, formed by a reaction with the reactive group of the carrier particle. The organic group C having a free functional group may be introduced to the carrier particle (A), directly or through a connecting organic group B, by employing a compound (C) having a functional group. Further, a hydrophilic or hydrophobic organic group D may be introduced to the carrier particle (A) by reacting the carrier particle (A) with the reactive group by employing a hydrophilic or hydrophobic compound (D).

[Carrier particle (A)]

As a carrier particle (A), any of the organic particles (polymer particles of thermoplastic resins and thermosetting resins) and inorganic particles (metals, carbons, metal compounds, ceramics, etc.) can be used. Such polymer particles may be crosslinked. These carrier particles can be used either singly or in a combination of two or more.

As a thermoplastic resin, among organic substances constituting a polymer particle, there may be exemplified olefinic resins (e.g. polyethylene, polypropylene, ethylene-propylene copolymer, polyethylene oxide, polypropylene oxide, maleic anhydride-modified polyolefin, glycidyl (meth)acrylate-modified polyolefin, (meth)acrilic acid-modified polyolefin, ethylene-vinyl acetate copolymer, etc.), vinyl acetate-series resins (polyvinyl acetate, vinyl acetate-vinyl chloride copolymer etc.), vinyl alcohol-series resins (e.g. polyvinyl alcohol, ethylene-vinyl alcohol copolymer, etc.), polyvinyl formals (e.g. polyvinyl acetal), rayons, chlorine-containing resins (e.g. polyvinyl chloride, polyvinylidene chloride-series resins, etc.), fluorine-containing resins, acrylic resins (e.g. polymethyl methacrylate, methyl methacrylate-(meth)acrylate copolymer, etc.), styrenic resins (e.g. polystyrene, styrene-methyl methacrylate copolymer, styrene-maleic anhydride copolymer, styrene-(meth)acrylate copolymer, styrene-acrylonitrile copolymer (AS resin), acrylonitrile-butadiene-styrene copolymer (ABS resin), maleic anhydride-modified AS resins, maleic anhydride-modified ABS resins, etc.), copolymers of styrene-acrylic monomer, polyesters (e.g. polyalkylene terephthalates such as polyethylene terephthalate, polybutylene terephthalate, polyalkylene naphthalates such as polyethylene naphthalate, polyallylates, etc.), polyamides (e.g. polyamide 6, polyamide 6-6, polyamide 6-10, polyamide 11, polyamide 12, aromatic polyamide, etc.), thermoplastic polyurethane resins, polycarbonate resins (e.g. bisphenol A-based polycarbonate, etc.), polyacetals, polyphenylene ethers, polyphenylene sulfides, polysulfones, polyether sulfones, polyether ether ketones, liquid crystalline polymers, cellulose esters, etc. Among such thermoplastic resins, a polymer obtainable by addition polymerization reaction (e.g. vinyl acetate-series resins, acrylic resins, styrenic resins, etc.) may be a particulate polymer obtainable by emulsion polymerization or suspension polymerization.

The thermosetting resins include, for example, not only phenol resins, amino resins (e.g. urea resin, melamine resin, etc.), unsaturated polyester resins, vinyl ester resins, diallyl phthalate resins, epoxy resins, polyurethane resins, silicone resins (silicon resins), polyimides, etc. but also crosslinked or cured (hardened) thermosetting resins.

Inorganic substances forming an inorganic particle include, for example, metals (e.g. aluminium, nickel, tungsten, gold, silver, copper, platinum, cadmium, zinc, lead, etc.), carbons (e.g. carbon black, graphite, fralene, etc.), metal compounds or ceramics, etc. The metal compounds include naturally-occurring inorganic compounds (e.g. quartz sand, quartz, glass, mica, talc, clay, diatomaceous earth, etc.), carbonates (e.g. calcium carbonate, magnesium carbonate, etc.), metal sulfates (barium sulfate, etc.), metal oxides (e.g. silicon oxides such as silicon dioxide, glasses, aluminium oxide (alumina), titanium oxide, copper oxide, silver oxide, iron oxide $Fe_2O_3$, $Fe_3O_4$, zinc oxide, zirconium oxide, magnesium oxide, etc.), metal hydroxides (e.g. aluminium hydroxide), metal sulfides (e.g. cadmium sulfide, zinc sulfide, molybdenum disulfide), potassium titanates, aluminium borates. As ceramics, there may be exemplified oxide-series ceramics (e.g. silicon oxide, alumina, titanium oxide, zirconia, etc.), non-oxide-series ceramics (e.g. carbides such as silicon carbide, boron carbide, nitrides such as titanium nitride, boron nitride, aluminium nitride, silicon nitride, silicides, borides).

As concrete examples of the carrier particle (A), there may be exemplified organic particulate substances (e.g. a polymethyl methacrylate or polystyrene which may be crosslinkable, polymer particles such as silicone resin), inorganic particulate substances (e.g. inorganic particles such as silicon dioxide, calcium carbonate, titanium oxide, aluminum oxide, gold, silver, copper, platinum, carbon black).

The configuration of the carrier particle (A) is not particularly restricted, and may be spherical, oval, flat, bar- or rod-like, etc. The mean particle size of the carrier particle (A) can be selected within the broad range according to the intended application, and may be, for example, about 1 nm to 100 $\mu$m, preferably about 5 nm to 50 $\mu$m, more preferably about 5 nm to 20 $\mu$m.

[Reactive group of carrier particle (A) and compound (B) having a connecting organic group B]

The carrier particle (A) can be a carrier (A1) (for example, a polar organic polymer particle or carbon black, etc.) which itself has a reactive group, provided that the introduction of an organic group C having a free functional group is possible. Further, the carrier particle (A) may be a carrier (A2) with a reactive group introduced by a reaction with a compound (B) having a connecting organic group B. Further, even if the carrier particle (A) is the carrier (A1) which itself has a reactive group, additional reactive groups can still be introduced by the compound (B) having a connecting organic group B. As the compound (B) having a connecting organic group B, reaction agents having a reactive functional group (b1) reactive to the carrier particle (A), and a reactive group (b2) reactive to the compound (C) having an organic group C can be used. The reactive functional group (b1) and reactive group (b2) may be the same or different.

The reactive group of the carrier (A) or the reactive group (b2) of the compound (B) may be selected according to the species of the compound (C) having an organic group C, and examples of the reactive groups are a hydroxyl group, a mercapto group, a formyl group (aldehyde group), an alkylcarbonyl group (keton group), a carboxyl group (including an active ester group such as N-succinimdyloxycarbonyl, cyclohexylaminocarbonyl group, etc.), an acid anhydride group, an ester group, a cyclic ester group, a cyclic ether groups (including an epoxy group, a glycidyl group), an amino group, an isocyanate group, an oxazoline group, a vinyl group (including a (meth)acryloyl group, etc.), condensable or hydrolyzable organic silicon groups (e.g. a halo-substituted silyl group, a hydroxy-substituted silyl group, an alkoxyl-substituted silyl group). Preferred reactive groups are usually a carboxyl group (including an active ester group), an acid anhydride group, a cyclic ether group, an amino group, an oxazoline group, and an organic silicon group.

Moreover, to a carrier particle formed of an organic substance, a reactive group may be introduced by copolymerization of a monomer having the reactive group (e.g. carboxyl group-containing monomers such as (meth) acrylate, maleic acid, etc., acid anhydride group-containing monomers such as maleic anhydride, epoxy group-containing monomers such as glycidyl (meth)acrylate), or an oligomer or polymer having a reactive group. Further, the reactive group may be introduced to the organic substance by utilizing various reactions such as oxidation, reduction, halogenation, etc. Furthermore, a reactive group may be introduced to the organic substance by using a polymer reaction, in which the organic substance is reacted with a reagent having the above-described reactive group or capable of producing the reactive group.

In many cases, to a preferable carrier particle (A) composed of an inorganic substance, a reactive group is introduced by a treatment or reaction with a compound (B) having a connecting organic group B.

The compound (B) having a connecting organic group B can be selected according to the species of the carrier (A) and a compound (C) having an organic group C, etc., and combinations of the carrier (A) and the compound (B) are, for example, as follows. The carrier (A) and the compound (B) are mutually exchangeable.

1. In the case where the carrier (A) has the following reactive group (a1)

When the carrier (A) has a reactive group (a1), the carrier (A) may be subjected to a treatment or reaction with the compound (B) to further produce a reactive group. In this case, the compound (B) having a connecting organic group B can be employed instead of the compound (C) having an organic group C. Therefore, when the carrier (A) having the functional group is treated or reacted with the compound (B) having an organic group C, the compound (C) having a functional group is not necessarily required.

(a1-1) halogen atom:
(B) amino group-containing compounds, hydroxyl group-containing compounds, or mercapto group-containing compounds (a1-2) hydroxyl group and mercapto group:
(B) carboxyl group-containing compounds, acid anhydride group-containing compounds, ester group- or cyclic ester group-containing compounds, isocyanate group-containing compounds, oxazoline group-containing compounds, or organic silicon group-containing compounds (a1-3) carboxyl group and acid anhydride group:
(B) hydroxyl group-containing compounds, mercapto group-containing compounds, ester group- or cyclic ester group-containing compounds, amino group-containing compounds, cyclic ether group-containing compounds, isocyanate group-containing compounds, oxazoline group-containing compounds, or organic silicon group-containing compounds (a1-4) amino group:
(B) carboxyl group-containing compounds, acid anhydride group-containing compounds, formyl group- or alkylcarbonyl group-containing compounds, ester group- or cyclic ester group-containing compounds, cyclic ether group-containing compounds, isocyanate group-containing compounds, oxazoline group-containing compounds, or organic silicon group-containing compounds (a1-5) epoxy group:
(B) carboxyl group-containing compounds, acid anhydride group-containing compounds, or amino group-containing compounds (a1-6) isocyanate group:
(B) hydroxyl group-containing compounds, mercapto group-containing compounds, carboxyl group-containing compounds, or amino group-containing compounds (a1-7) vinyl and (meth)acryloyl group:
(B) vinyl group-containing compounds, or (meth)acryloyl group-containing compounds 2. In the case where the carrier (A) is composed of an inorganic substance (such as metal oxides, ceramics):
(B) organic silicon group-containing compounds 3. In the case where the carrier (A) is composed of a metal
(B) organic silicon group-containing compounds, or coordinative compounds The hydroxyl group-containing compounds include diols for example aliphatic diols such as ethylene glycol, diethylene glycol, polyethylene glycol, propylene glycol, dipropylene glycol, polypropylene glycol, tetramethylene glycol, polytetramethylene glycol, hexanediol; aliphatic polyhydric alcohols such as glycerol, trimethylolpropane; alicyclic diols such as 1,4-cyclohexanediol, hydrogenated bisphenol A; aromatic diols such as bisphenol A, alkylene oxide adduct of bisphenol A. The hydroxyl group-containing compounds include compounds containing an ester group such as acetyloxy group. As mercapto group-containing compounds, there may be exemplified dithiols corresponding to the above-described diols.

As formyl group- or alkylcarbonyl group-containing compounds, there may be exemplified dialdehydes (e.g. glyoxal, methylglyoxal, succinaldehyde), diketones (e.g. dioxime derivatives such as diacetyl, dimethylglyoxime, acetylacetone), aldehyde-acids (e.g. glyoxal-acid), ketonic acids (e.g. pyruvic acid).

The carboxyl group- or acid anhydride group-containing compounds include, for example, dicarboxylic acids (e.g. saturated aliphatic dicarboxylic acids such as oxalic acid, malonic acid, succinic acid, methylsuccinic acid, glutaric acid, adipic acid, pimelic acid, suberic acid, azelaic acid, sebacic acid; unsaturated aliphatic dicarboxylic acids such as maleic acid, fumaric acid, itaconic acid; alicyclic dicarboxylic acids such as 1,4-cyclohexane dicarboxylic acid, hexahydrophthalic acid, himic acid, 1,2,3,4-cyclobutanetetracarboxylic acid; aromatic dicarboxylic acids such as phthalic acid, isophthalic acid, terephthalic acid, trimellitic acid, pyromellitic acid); or acid anhydrides thereof or derivatives thereof (for example, lower alkyl esters such as methylester, carboxylic halide, active ester).

The carboxyl group-containing compounds may have a hydroxyl group. Compounds having a hydroxyl group and a carboxyl group include aliphatic hydroxycarboxylic acids (e.g. glycolic acid, lactic acid, hydroxypropionic acid, tartronic acid, malic acid, tartaric acid, citric acid, pantothenic acid), aromatic hydroxycarboxylic acids (e.g. p-hydroxybenzoic acid, salicylic acid), and the like. The compounds having a hydroxyl group and a carboxyl group further include hydroxycarboxylic acids having about 6 to 18 carbon atoms such as hydroxyhexanoic acid, hydroxyoctanoic acid, hydroxydecanoic acid, hydroxydedecanoic acid, hydroxyoctadecanoic acid, and cyclic ester group-containing compounds (e.g. lactones such as γ-caprolactone, γ-laurolactone, γ-palmitolactone, γ-stearolactone, δ-valerolactone, δ-caprolactone) and the like.

As amino group-containing compounds, there may be exemplified aliphatic diamines [e.g. alkylene diamines such as ethylene diamine, γ-(methylamino) propylamine, diaminopropane, tetramethylenediamine, hexamethylenediamine, 2,2,4-trimethylhexamethylene diamine, 1,10-diaminodecane, $\alpha,\omega$-$C_{11-12}$ alkylene diamine, 1,12-diaminododecane, heptadecamethylenediamine; diethylenetriamine, triethylenetetramine, pentaethylenehexamine, polyether diamine); alicyclic diamines (e.g. isophorone diamine, bis(aminomethyl) cyclohexane, bis(4-amino-3-methylcyclohexyl)methane); aromatic diamines (e.g. m- or p-phenylenediamine, diaminotoluene, xylylenediamine, 4,4'-diaminodiphenylmethane, 4,4'-diaminodiphenylether, 4,4'-diaminodiphenylsulfone) or the like.

The amino group-containing compounds may have a hydroxyl group or a carboxyl group. As compounds having an amino group and a hydroxyl group, there may be exemplified amino alcohols (e.g. 2-aminoethanol, diethanolamine, 2-aminoisopropanol), aminophenols.

As compounds having an amino group and a carboxyl group, there may be exemplified amino acids (e.g. glycine, alanine, valine, leucine, isoleucine, lysine, serine, threonine, phenylalanine, aspartic acid, glutamic acid, methionine, arginine, tryptophan, histidine, proline, hydroxyproline, cystine) or active esters thereof, aliphatic aminocarboxylic acids (e.g. aminocaproic acid, aminoundecanoic acid) or corresponding lactams thereof, aromatic aminocarboxylic acids (e.g. aminobenzoic acid, etc.) or the like.

In these compounds, a hydroxyl group may be protected by a protecting group (e.g. benzylcarbonyl group, a substituted benzylcarbonyl group, t-butylcarbonyl group, tetrahydropyranylcarbonyl group), and a carboxyl group may be protected by a protecting group (e.g. benzyloxy group, a substituted benzyloxy group, t-butyloxy group, phenacyloxy group). Further, an amino group may be protected by a protecting group (e.g. benzyloxycarbonyl group, t-butoxycarbonyl group (Boc)).

As cyclic ether group-containing compounds, there may be exemplified alkylene oxides (e.g. ethylene oxide, propylene oxide), epichlorohydrin, glycidyl ethers (bisphenol A-based epoxy compounds, alkylene glycoldiglycidyl ether, polyoxyalkylene glycoldiglycidyl ether, 1,4-cyclohexane dimethanol diglycidyl ether), glycidyl esters (e.g. diglycidyl phthalate, diglycidyl tetrahydro phthalate, diglycidyl hexahydro phthalate, diglycidyl ester of dimeric acid), glycidylamines (e.g. diglycidylaniline, diglycidyltoluidine, N,N-diglycidyl-4-glycidyloxyaniline).

As isocyanate group-containing compounds, there may be exemplified aromatic diisocyanates (e.g. tolylenediisocyanate, 4,4'-diphenylmethane diisocyanate, xylylenediisocyanate), aliphatic diisocyanates (e.g. isophorone diisocyanate, 4,4'-methylenebis(cyclohexylisocyanate), methylcyclohexane diisocyanate), aliphatic diisocyanates (e.g. hexamethylenediisocyanate, lysine diisocyanate).

As vinyl group- or (meth)acryloyl group-containing compounds, there may be exemplified compounds having a hydroxyl group (e.g. $C_{2-10}$alkylene glycol mono (meth) acrylates such as 2-hydroxyethyl (meth) acrylate, 2-hydroxypropyl (meth)acrylate, butanediol mono(meth) acrylate; polyoxy$C_{2-4}$alkylene glycol mono(meth)acrylates, allyl alcohol), compounds having a carboxyl group or acid anhydride group (e.g. (meth) acrylic acid, itaconic acid, maleic anhydride), compounds having an amino group (e.g. aminostyrene, vinylamine, allylamine), compounds having an epoxy group (e.g. allylglycidyl ether, glycidyl (meth) acrylate), compounds having an isocyanate group (e.g. vinylisocyanate) or the like.

The oxazoline group-containing compounds include bisoxazoline compounds represented by the following formula:

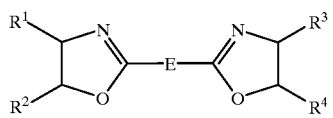

wherein E represents an alkylene group which may have a substituent, a cycloalkylene group which may have a substituent or an arylene group which may have a substituent; $R^1$, $R^2$, $R^3$ and $R^4$ are the same or different, each representing an alkyl group which may have a hydrogen atom and a substituent, or an aryl group which may have a substituent).

In the bisoxazoline compounds represented by the formula shown above, as an alkylene group of E, there may be exemplified $C_{1-10}$ alkylene groups (e.g. methylene, ethylene, trimethylene, propylene, tetramethylene, pentamethylene, hexamethylene). The cycloalkylene groups include, for example, $C_{5-10}$ cycloalkylene groups (e.g. 1,3-cyclopentylene, 1,3-cyclohexylene, 1,4-cyclohexylene). The arylene groups include $C_{6-12}$arylene groups (e.g. 1,3-phenylene, 1,4-phenylene, 1,5-naphthylene, 2,5-naphthylene group) and the like.

The alkylene groups, cycloalkylene groups, or arylene groups may have a substituent. Examples of such substituent are halogen atoms (e.g. fluorine atom, chlorine atom, bromine atom), alkyl groups (e.g. alkyl groups having about 1 to 6 carbon atoms, such as methyl, ethyl, propyl, isopropyl, butyl, isobutyl, s-butyl, t-butyl), alkoxy groups (e.g. alkoxy groups having about 1 to 6 carbon atoms, such as methoxy, ethoxy, propoxy, isopropoxy, butoxy).

Preferred examples of E include an aryl group which may have a substituent, particularly, phenylene group which may have a substituent (for example, 1,3-phenylene group or 1,4-phenylene group).

In the aforementioned formula, examples of the alkyl groups represented by $R^1$, $R^2$, $R^3$ and $R^4$ are $C_{1-10}$alkyl groups such as methyl, ethyl, propyl, isopropyl, butyl, isobutyl, s-butyl, t-butyl, pentyl, hexyl. Among those, the preferred alkyl groups are lower alkyl groups having about 1 to 6 carbon atoms, especially lower alkyl groups having about 1 to 4 carbon atoms (for example, particularly, methyl group, ethyl group, propyl group, isopropyl group).

The aryl groups represented by $R^1$, $R^2$, $R^3$ and $R^4$ include phenyl, 1-naphthyl, 2-naphthyl group, etc.

The above-described alkyl groups or aryl groups may have a substituent. The alkyl groups having a substituent include, for example, $C_{1-4}$alkyl halide groups such as dichloromethyl, trichloromethyl, trifluoromethyl, 2,2,2-trichloroethyl, 2,2,2-trifluoroethyl, pentafluoroethyl. As aryl groups having a substituent, there may be exemplified phenyl groups having a halogen atom, such as 2-chlorophenyl, 3-chlorophenyl, 4-chlorophenyl, 2,4-dichlorophenyl, 3 5-dichlorophenyl; $C_{1-4}$alkyl-phenyl groups such as 2-methylphenyl, 3-methylphenyl, 4-methylphenyl, 2,4-dimethylphenyl, 3,5-dimethylphenyl, 4-ethylphenyl; $C_{1-4}$alkoxy-phenyl groups such as 2-methoxyphenyl, 3-methoxyphenyl, 4-methoxyphenyl, 2,4-dimethoxyphenyl, 3,5-dimethoxyphenyl, 4-ethoxyphenyl.

Particularly preferred bisoxazoline compounds can be represented by the following formula:

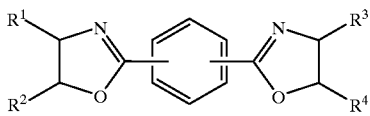

wherein $R^1$, $R^2$, $R^3$ and $R^4$ are the same or different, each representing a hydrogen atom or a $C_{1-4}$ alkyl group.) Particularly, it is preferable that at least one of $R^1$ and $R^2$ (particularly, $R^2$) is a hydrogen atom, and that at least one of $R^3$ and $R^4$ (particularly, $R^4$) is a hydrogen atom. It is more preferable that every $R^1$, $R^2$, $R^3$ and $R^4$ is a hydrogen atom.

Among such bisoxazoline compounds represented by the formula shown above, concrete examples of the preferred compounds are 1,6-bis(1,3-oxazoline-2-yl)hexane, 1,8-bis (1,3-oxazoline-2-yl)octane, 1,10-bis(1,3-oxazoline-2-yl) decane, 1,3-bis(1,3-oxazoline-2-yl)cyclohexane, 1,4-bis(1, 3-oxazoline-2-yl)cyclohexane, 2,2'-(1,3-phenylene)-bis(2-oxazoline), 2,2'-(1,4-phenylene)-bis(2-oxazoline), 2,2'-(1,2-phenylene)-bis(2-oxazoline), 2,2'-(1,3-phenylene)-bis(4-methyl-2-oxazoline), 2,2'-(1,4-phenylene)-bis(4-methyl-2-oxazoline), 2,2'-(1,2-phenylene)-bis(5-methyl-2-oxazoline), 2,2'-(1,3-phenylene)-bis(5-methyl-2-oxazoline), 2,2'-(1,4-phenylene)-bis(5-methyl-2-oxazoline), 2,2'-(1,3-phenylene)-bis(4-methylphenyl-2-oxazoline), 2,2'-(1,4-phenylene)-bis(4-methylphenyl-2-oxazoline), 2,2'-(1,3-phenylene)-bis(4- chlorophenyl-2-oxazoline), 2,2'-(1,4-phenylene)-bis(4- chlorophenyl-2-oxazoline).

Such bisoxazoline compounds can be used either singly or in a combination of two or more species.

Bisoxazoline compounds can be obtained, according to the conventional methods such as the method which comprises reacting a fatty acid or a methyl ester thereof in the presence of a catalyst to produce a 5-membered heterocyclic compound ("Plastic Age", p.114, March 1995), by reacting the dicarboxylic acid corresponding to E in the aforementioned formula or lower alkyl ester with an ethanolamine or derivative thereof to produce a 5-membered heterocyclic compound.

The organic silicon group-containing compounds include organosilicon compounds (silane coupling agents) having a condensable or hydrolyzable group (e.g. a halo-substituted silyl group, a hydroxy-substituted silyl group, an alkoxy-substituted silyl group) and a reactive group (e.g. a halogen atom, a hydroxyl group, a mercapto group, a carboxyl group, an amino group, an epoxy group, an isocyanate group, a vinyl group, a (meth) acryloyl group). The organosilicon compounds usually have a condensable or hydrolyzable group as a reactive functional group (b1) reactive to the carrier (A), and a reactive group (b2) reactive to the compound (C) or the compound (D).

Examples of the preferred reactive group of the organosilicon compounds (silane coupling agents) include a halogen atom, a hydroxyl group, a mercapto group, a carboxyl group, an amino group, an epoxy group, an isocyanate group (particularly, a hydroxyl group, a mercapto group, a carboxyl group, an amino group, an epoxy group, an isocyanate group). The organosilicon compounds may have one reactive group or a combination of two or more reactive groups.

The halogen atoms include chlorine atom, bromine atom, iodine atom and the like, and an epoxy group may be constituted of an epoxy ring produced by the oxidation of unsaturated bond of a hydrocarbon group (e.g. unsaturated double bond of a cycloalkenyl group such as cyclopentenyl group, cyclohexenyl group), and an epoxy ring of a glycidyl group. An amino group may be substituted with one or two lower $C_{1-4}$alkyl groups (for example, methyl, ethyl, propyl, isopropyl, butyl), and a (meth)acryloyl group may be constituted of a (meth)acryloyloxy group.

As an alkoxy group of the silane coupling agent, there may be exemplified $C_{1-4}$ alkoxy groups such as methoxy, ethoxy, propoxy, isopropoxy, butoxy, isobutoxy, s-butoxy, t-butoxy. Preferred alkoxy groups are hydrolyzable alkoxy groups (particularly, methoxy group or ethoxy group).

In the silane coupling agent, the number of the above-described reactive group is about 1 to 3 (particularly, 1 or 2) and that of the alkoxy group is about 1 to 3 (particularly, 2 or 3).

Concrete examples of the silane coupling agent are halogen-containing silane coupling agents (e.g. 2-chloroethyltrimethoxysilane, 2-chloroethyltriethoxysilane, 3-chloropropyltrimethoxysilane, 3-chloropropyltriethoxysilane), hydroxyl group-containing silane coupling agents (e.g. 2-hydroxylethyltrimethoxysilane, 2-hydroxyethyltriethoxysilane, 3-hydroxypropyltrimethoxysilane, 3-hydroxypropyltriethoxysilane), mercapto group-containing silane coupling agents (e.g. 2-mercaptoethyltrimethoxysilane, 2-mercaptoethyltriethoxysilane, 3-mercaptopropylmethyldimethoxysilane, 3-mercaptopropyltrimethoxysilane, 3-mercaptopropyltriethoxysilane), carboxyl group-containing silane coupling agents (e.g. carboxymethyltrimethoxysilane, carboxymethyltriethoxysilane, 2-carboxyethyltrimethoxysilane, 2-carboxyethyltriethoxysilane, 3-carboxypropyltrimethoxysilane, 3-carboxypropyltriethoxysilane), amino group-containing silane coupling agents (e.g. 2-aminoethyltrimethoxysilane, 3-aminopropyltrimethoxysilane, 3-aminopropyltriethoxysilane, 3-aminopropylmethyldiethoxysilane, 2-[N-(2-aminoethyl) amino]ethyltrimethoxysilane, 3-[N-(2-aminoethyl)amino] propyltrimethoxysilane, 3-(2-aminoethyl) aminolpropyltriethoxysilane, aminopropylsilane triol), epoxy group-containing silane coupling agents [2-(3,4-epoxycyclohexyl)ethyltrimethoxysilane, 2-(3,4-epoxycyclohexyl)ethyltriethoxysilane, 3-(3,4-epoxycyclohexyl)propyltrimethoxysilane, 2-glycidyloxyethyltrimethoxysilane, 2-glycidyloxyethyltriethoxysilane, 3-glycidyloxypropyltrimethoxysilane, 3-glycidyloxypropyltriethoxysilane, etc.], isocyanate group-containing silane coupling agents (e.g. 2-isocyanateethyltrimethoxysilane, 2-isocyanateethyltriethoxysilane, 3-isocyanatepropyltrimethoxysilane, 3-isocyanatepropyltriethoxysilane, 3-isocyanatepropyldimethylchlorosilnae), vinyl group-containing silane coupling agents (e.g. vinyl trimethoxysilane, vinyl triethoxysilane), (meth)acryloyl group-containing silane coupling agents (e.g. 2-methacryloyloxyethyltriethoxysilane, 2-methacryloyloxy ethyltrimethoxysilane, 2-methacryloyloxyethyltrimethoxysilane, 3-methacryloyloxypropyltrimethoxysilane, 3-methacryloyloxypropyltriethoxysilane, 3-acryloyloxypropyltrimethoxysilane). These silane coupling agents can be used either alone or as a combination of two or more.

Moreover, in the case where the carrier (A) is a metal, for example, mercaptoalcohols (e.g. mercaptoethanol), sulfur- or nitrogen-containing compounds (e.g. cysteine, histidine) may be exemplified as a compound having a functional group capable of coordinative bonding at least with a metal (a coordinative compound). For example, in the case of a mercaptoethanol, since a mercapto group forms a coordination bond with the exemplified metals (e.g. gold, platinum), the residual hydroxyl group can be used in a reaction with a compound (C).

[Compound (C) having an organic group C]

As a free functional group of the organic group C, there may be exemplified various functional groups such as oxazoline groups recited in the item [Compound (B)], a cyclic ester group, a cyclic ether group, an isocyanate group, a hydroxyl group, a mercapto group, a carboxyl group, an acid anhydride group, an ester group, an amino group, a formyl group, a carbonyl group, a vinyl group, a hydroxysilyl group, an alkoxysilyl group, a halosilyl group, a hydrosilyl group. Moreover, as a compound (C), various kinds of compound reactive to the above-mentioned free functional groups and the reactive groups of the above-described carrier (A) or compound (B) can be employed. Such compounds (C) described above may have a plurality of functional groups, and the species of plural functional groups may be the same or different.

The compound (C) having a functional group can be selected according to a reactive group of the carrier (A) or compound (B), for example, like combinations of the reactive groups of the carrier (A) and the compound (B) exemplified in the preceding items.

Preferred compounds (C) include compounds (e.g. carboxyl group- or acid anhydride group-containing compounds, amino group-containing compounds, oxazoline group-containing compounds) having a functional group reactive to hydroxyl group, carboxyl group, cyclic ether group (e.g. epoxy group or glycidyl group) and amino group, particularly amino group-containing compounds (e.g. diamines) and oxazoline group-containing compounds (e.g. bisoxazoline compounds).

[Hydrophilic or hydrophobic compound (D)]

A hydrophilic or hydrophobic organic group D may be introduced to a reactive particle in order to control the reactivity of the above-described reactive particle. By introducing a hydrophilic or hydrophobic organic group D, the reactive particle is imparted or afforded hydrophilic or hydrophobic properties. As a result, the uses of the reactive particle can be developed. Compounds (D) having a hydrophilic or hydrophobic organic group D are monofunctional compounds usually reactive to a reactive group of the above-described carrier (A) and/or reactive group of the compound (B), and unreactive to a functional group of the compound (C).

In the formula (I), as a hydrophilic or hydrophobic organic group D, there may be exemplified (1) alkyl groups, (2) aryl groups, (3) aralkyl groups, (4) heterocyclic groups, (5) organic groups selected from alkyl groups, aryl groups, aralkyl groups and heterocyclic groups, each having at least one selected from amide bond, urethane bond, urea bond and ester bond, (6) polyoxyalkylene groups, (7) saccharic or saccharide residues. These organic groups D can be introduced to the carrier (A) either alone or as a combination of two or more.

The hydrophilic or hydrophobic compounds (D) usually have a hydroxyl group, a mercapto group, a carboxyl group, an acid anhydride group, an amino group, a reactive organic silicon group (e.g. a halo-substituted silyl group, a hydroxy-substituted silyl group, an alkoxy-substituted silyl group) as a reactive group reactive to the carrier (A) or compound (B). Preferred reactive groups include hydroxyl groups, carboxyl groups, amino groups, reactive organic silicon groups (particularly, carboxyl groups, amino groups, condensable or hydrolyzable organic silicon groups).

(1) Alkyl groups include, for example, $C_{1-30}$alkyl groups such as methyl, ethyl, propyl, isopropyl, butyl, t-butyl, hexyl, octyl, decyl, dodecyl, tetradecyl, oleyl, stearyl, behenyl. (2) Aryl groups include $C_{6-12}$aryl groups such as phenyl, naphthyl. (3) Aralkyl groups include $C_{6-12}$ aryl - $C_{1-4}$ alkyl groups such as benzyl, phenethyl. (4) Heterocyclic groups include, for example, condensable heterocyclic groups in addition to 5- or 6-membered heterocyclic groups, and there may be exemplified heterocyclic groups having an oxygen atom as a heteroatom (e.g. furyl, pyranyl, chromanyl), heterocyclic groups having a sulfur atom as a heteroatom (e.g. thienyl group, etc.), heterocyclic groups having a nitrogen atom as a heteroatom (e.g. pyrrolyl, pyrrolidinyl, piperidinyl, piperadinyl, morpholino, morpholinyl, imidazolyl, pyridyl, pyrimidinyl, indolyl, quinolyl, purinyl).

Compounds (D) having such alkyl groups, aryl group, aralkyl groups or heterocyclic groups include. alcohols, thiols, carboxylic acids, amines, organic silicon compounds, etc.

As alcohols, there may be exemplified aliphatic alcohols (e.g. methanol, ethanol, isopropanol, butanol, t-butanol, hexanol, lauryl alcohol, tetradecyl alcohol, cetyl alcohol, octadecyl alcohol, arachidic alcohol, ceryl alcohol, melissyl alcohol, oleyl alcohol, stearyl alcohol), oxyalkylene glycol monoalkyl ethers (e.g. $C_{1-6}$alkyl ethers such as methyl cellosolve, ethyl cellosolve, butyl cellosolve), alicyclic alcohols (e.g. cyclohexanol), aromatic alcohols [e.g. phenols such as phenol, alkyl phenols (e.g. $C_{4-20}$alkyl-phenol); aralkyl alcohols such as benzyl alcohol, phenethyl alcohol], heterocyclic alcohols (e.g. indole-5-ol, quinolinol, hydroxythiophene, 1-hydroxypiperidine). As thiols, there may be exemplified thioalcohols which correspond to the aforementioned alcohols.

As carboxylic acids, there may be exemplified saturated fatty acids such as formic acid, acetic acid, propionic acid, butyric acid, caproic acid, caprylic acid, capric acid, lauric acid, myristic acid, palmitic acid, stearic acid, dioxystearic acid, behenic acid, montanic acid; unsaturated fatty acids such as linderic acid, palmitoleic acid, oleic acid, elaidic acid, linoleic acid, linolenic acid, eleostearic acid, arachidonic acid, erucic acid; alicyclic carboxylic acids such as cyclohexane carboxylic acid; aromatic carboxylic acids such as benzoic acid; heterocyclic carboxylic acids such as furancarboxylic acid, thiophenecarboxylic acid, indolecarboxylic acid, indole acetic acid, nicotinic acid, isonicotinic acid. These carboxylic acids can be used either alone or as a combination of two or more.

As amines, there may be exemplified primary amines (e.g. aliphatic amines [e.g. methylamine, ethylamine, butylamine, hexylamine, caprylamine, laurylamine, myristylamine, palmitylamine, stearylamine, oleylamine), alicyclic amines (e.g. cyclohexylamine), aromatic amines (e.g. aniline, toluidine), heterocyclic amines (e.g. aminopurine, cytosine, acetylated 2,6-diaminopyridine)], secondary amines [aliphatic amines (e.g. dimethylamine, diethylamine, dibutylamine, dihexylamine, didecylamine, didodecylamine, ditetradecylamine, dihexadecylamine, dioctadecylamine)]. These amines also can be used either singly or as a combination of two or more.

As organic silicon compounds, there may be exemplified alkyl group-containing silane coupling agents (e.g.

$C_{1-18}$alkyl group-containing compounds such as dimethylethoxysilane, dimethymethoxychlorosilane, dimethylchlorosilane, n-butyltrimethoxysilane, n-hexyltrimethoxysilane, n-octyltrimethoxysilane), aryl group-containing silane coupling agents (e.g. phenyltris(dimethylsiloxy)silane, disilylbenzene, diphenylsilane), aralkyl group-containing silane coupling agents (e.g. benzyltrimethoxysilane, benzyltriethoxysilane), heterocyclic group-containing organic silicon compounds (e.g. 2-(2-piperadino ethyl thioethyl)trimethylsilane).

Among organic groups (5), alkyl groups, aryl groups and aralkyl groups include the above-exemplified alkyl groups, aryl groups, aralkyl groups and heterocyclic groups. As organic groups having an amido bond, an urethane bond, an urea bond, or an ester bond, there may be exemplified dicarboxylic residues in which one of the carboxyl groups forms an amide group (carboxylic residues having an amide bond), diamine residues in which one of the amino groups forms an amide group (amine residues having an amide bond), diol residues in which one of the hydroxyl groups forms an urethane group (alcohol residues having an urethane bond), diamine residues in which one of the amino groups forms an urea group (amine residues having an urea bond), dicarboxylic residues in which one of the carboxyl groups is esterified (carboxylic residues having an ester bond), diol residues in which one of the hydroxyl groups is esterified (alcohol residues having an ester bond), etc.

As polyoxyalkylene groups (6), there may be exemplified polyoxyalkylene glycol monoalkylethers (e.g. polyethylene glycol mono$C_{1-6}$alkylether, polypropylene glycol mono$C_{1-6}$alkylether, polyoxytetramethylene glycol mono$C_{1-6}$alkylether). Saccharic or saccharide residues (7) include completely or partially O-alkylated (e.g. benzylated, methoxylated) or O-esterified (e.g. benzoylated, acetylated) succharide residues and oligosaccharide residues.

These hydrophilic or hydrophobic compounds (D) may be used in a combination of plural compounds of which the species being different from each other. In this case, a hydrophilic compound (D1) and a hydrophobic compound (D2) may be used in combination.

The reactive particle of the present invention can be represented by the following formula (I):

$$[C-(B1)_m]_n-A-[(B2)_p-D]_q \quad (I)$$

wherein A is a carrier particle, C is an organic group having at least one free functional group, D is a hydrophilic or hydrophobic organic group, B1 is an organic group connecting the carrier particle A and the organic group C, B2 is an organic group connecting the carrier particle A and the hydrophilic or hydrophobic organic group D, n is an integer of not less than 1, m and p are 0 or 1, q is 0 or an integer of not less than 1, and m and p may differ according to n and q, respectively.

Between the compounds (C) and (D) having a functional group, the reactive particle represented by the formula (I) shown above corresponds at least to a reaction product of the particulate carrier (A) (treated or reacted with the compound (B), if necessary) with the compound (C).

In the formula (I), the connecting organic groups B1 and B2 correspond to the residues of the compound (B) containing a bonded group which is produced by a reaction with the carrier (A) (for example, oxygen atom, sulfur atom, —COO— group, —NH— group, —NHCO— group, —CH(OH)—$CH_2$—, —SiO—). Preferred connecting organic groups B1 and B2 include a residue of a silane coupling agent containing a bonded group (e.g. oxygen atom, —COO— group, —NH— group, —NHCO— group, —CH(OH)—$CH_2$—, —SiO—).

Moreover, the carrier particle A or connecting organic group B is bound to the free functional group C, or to the hydrophilic or hydrophobic organic group D via a bonded group (e.g. oxygen atom, sulfur atom, —COO— group, —NH— group, —NHCO— group, —CH(OH)—$CH_2$—) by a reaction with the compound (C) or the hydrophilic or hydrophobic compound (D).

m and p are 0 or 1, depending on the presence or absence of the connecting organic group B. q is an integer of 0 or not less than 1, depending on the presence or absence of the hydrophilic or hydrophobic organic group D and the quantity of those introduced. n is an integer of not less than 1, depending on the quantity of organic group C having a free functional group. m, p and q may differ according to n and r, respectively.

Preferred reactive particles can be represented by the following formula:

wherein A is an inorganic carrier particle, C is an organic group having at least a free oxazoline group, B1 is a residue of a silane coupling agent having at least one reactive group selected from a hydroxyl group, a mercapto group, a carboxyl group, an amino group, an epoxyl group and an isocyanate group; n is an integer of not less than 1, m is 0 or 1, and may differ according to n.

More specifically, the preferred reactive particles can be represented by the following formula (i):

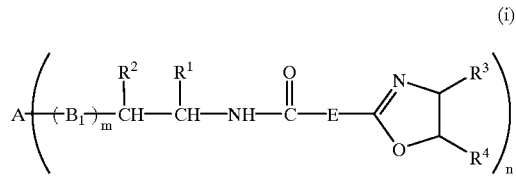

wherein $R^1$, $R^2$, $R^3$ and $R^4$ are the same or different, each representing a hydrogen atom, an alkyl group which may have a substituent, or an aryl group which may have a substituent; A, B1, E, m and n are as defined above.

The reactive particle represented by the formula (i) corresponds to a reactive particle using a bisoxazoline compound as a compound (C).

In the formula (i), $R^1$, R $R^3$ and $R^4$ are as defined above. Preferred $R^1$, $R^2$, $R^3$ and $R^4$ are hydrogen atoms or $C_{1-4}$ alkyl groups. As alkyl groups, there may be exemplified methyl, ethyl, propyl, isopropyl, butyl, isobutyl, s-butyl, t-butyl. The more preferred alkyl groups include methyl and ethyl group, especially methyl group. The particularly preferred $R^1$ and $R^3$ are a hydrogen atom or an $C_{1-4}$alkyl group (especially, methyl group), and the preferred $R^2$ and $R^4$ are hydrogen atoms.

Moreover, among reactive particles represented by the formula (i) shown above, preferred reactive particles can be represented by the following formula (ia):

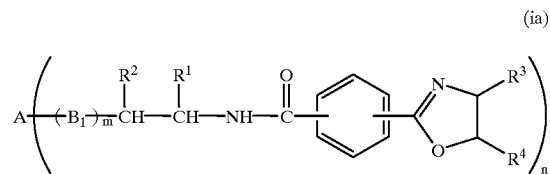

wherein $R^1$, $R^2$, $R^3$ and $R^4$ each represents a hydrogen atom or a $C_{1-4}$alkyl group; at least one of $R^1$ and $R^2$ represents a hydrogen atom, and at least one of $R^3$ and $R^4$ represents a hydrogen atom; A, B1, m and n are as defined above.

Such reactive particles (I) have a number of active sites (free functional groups) being in proportion to the amount of the introduced compound (C). Specifically, the reactive particles of (i) and (ia) have an oxazoline group highly reactive to various reactive groups. Therefore, a high crosslinking density, improvements in mechanical strength and chemical durability can be realized by adding a small quantity of these reactive particles.

[Method for producing reactive particles]

The above-mentioned reactive particles can be obtained by reacting a particulate carrier (A) having a reactive group, treated or reacted by a compound (B) (e.g. silane coupling agents, etc.) if necessary, with a compound (C) having a functional group reactive to the functional group of the carrier to produce particles having a free functional group. When the particulate carrier is an inorganic substance, except for the case where the carrier has a reactive group, such as carbon black, a particulate carrier to which a reactive group is introduced by a surface treatment with a silane coupling agent having at least one reactive group selected from a hydroxyl group, a mercapto group, a carboxyl group, an amino group, an epoxy group and an isocyanate group can be usually employed in the preferred method. Moreover, a hydrophilic or hydrophobic organic group D may be introduced to the reactive particle having a reactive group by allowing the carrier (A) to react with the hydrophilic or hydrophobic compound (D).

For a reaction of the carrier (A) with the compound (B), the conventional organic synthesis reactions may be used according to the species of the carrier (A), and the species of the reactive groups of the carrier (A) and the compound (B). For example, in the case of the carrier having a halogen atom (a1-1), a dehydrohalogenation reaction may be employed. In the case of the carrier having a hydroxyl group and mercapto group (a1-2), an esterification, an urethanation reaction (urethane-forming reaction), a ring-opening reaction of an oxazolinyl group and a condensation reaction of a coupling agent may be utilized. In the case of the carrier having a carboxyl group and an acid anhydride group (a1-3), an esterification, an amidation reaction (amide-forming reaction), an epoxy ring-opening reaction, an addition reaction to an isocyanate group (a reaction producing an amide bond), a ring-opening reaction of an oxazolinyl group and a condensation reaction of a coupling agent, or the like may be utilized. In the case of the carrier having an amino group (a1-4), an amidation reaction, an epoxy ring-opening reaction, an addition reaction to an isocyanate group (a reaction producing an urea bond), a ring-opening reaction of an oxazoline group, a condensation reaction of a coupling agent, or the like may be utilized. In the case of the carrier having an epoxy group (a1-5), a ring-opening reaction of an epoxy ring may be utilized. In the case of the carrier having an isocyanate group (a1-6), an addition reaction to an isocyanate group (e.g. a reaction producing an urethane bond, a reaction producing an urea bonding, a reaction producing an amide bond) may be utilized. In the case of the carrier having a vinyl group and an (meth)acryloyl group (a1-7), an addition reaction and an addition polymerization reaction may be utilized.

The reacting proportion of each component can be selected within a wide range according to the species or surface area of the carrier. The proportion of the compound (B) can be selected from the ranges of, for example, about 0 to 1000 parts by weight (e.g. about 0.1 to 1000 parts by weight), preferably about 0 to 500 parts by weight (e.g. about 0.1 to 500 parts by weight), more preferably about 0.2 to 200 parts by weight (e.g. about 0.2 to 150 parts by weight) relative to 100 parts by weight of the carrier (A). The reaction may be conducted in the presence or absence of a catalyst and also in the presence or the absence of an organic solvent. In many cases, as an organic solvent, a poor (bad) solvent which does not solubilize the carrier is employed. A reaction temperature may be selected within a range of, for example, about 20 to 150° C. according to the species of the carrier or the compound (B). Particulate reaction products may be separated by filtration or other techniques, washed with a suitable solvent, and subjected to the succeeding reactions.

To be concrete, the reaction of an organic or inorganic carrier with a silane coupling agent can be conducted by, for example, allowing the dispersed carriers to react with the silane coupling agent in an organic solvent inert to reactions, such as alcohols (e.g. methanol, ethanol, isopropanol). A reaction temperature may be selected within a range of, for example, about 30° C. to the reflux temperature of a solvent.

Each reaction of the compound (C) and the hydrophilic or hydrophobic compound (D) with a reactive group of the carrier (A) (or the reactive group introduced to the carrier (A) by the compound (B)) may be conducted at the same time or conducted successively.

The reaction of a reactive group of the carrier (A) (or the reactive group introduced to the carrier (A) by the compound (B)) with the compound (C) may be conducted, according to the species of the carrier (A), the compound (B) or the compound (C), in the same manner as in the reaction of the carrier (A) with compound (B) described above. The proportion of the compound (C) is usually equivalent or above (specifically, excessive) relative to the reactive group of the carrier (A), and may be, for example, about 0.5 to 5 mole of the compound (C), preferably about 0.7 to 3 mole, more preferably about 0.8 to 2 mole relative to 1 mole of the reactive group of the carrier (A). The proportion by weight of the compound (C) can not be determined precisely because of its dependence on the molecular weight of the compound (C). However, the proportion of the compound (C) can be selected from the ranges of about 0.1 to 200 parts by weight, preferably about 0.1 to 150 parts by weight, more preferably about 0.1 to 100 parts by weight relative to 100 parts by weight of the carrier (A). This reaction may also be conducted in the presence or the absence of a catalyst. Moreover, it may be conducted in the presence of a solvent inert to the reaction, and in a suspended system or a dispersed system. As the solvent, there may be exemplified alcohols such as methanol, ethanol, isopropanol; aliphatic hydrocarbons such as pentane, hexane, octane; alicyclic hydrocarbons such as cyclohexane, methylcyclohexane; aromatic hydrocarbons such as benzene, toluene, xylene; halogenated hydrocarbons such as methyl chloride, methylene chloride, chloroform, trichloroethylene; esters such as ethyl acetate; ketones such as acetone, methyl ethyl ketone; ethers such as diethyl ether, diisopropyl ether, dioxane, tetrahydrofuran; nitrogen-containing compounds such as N-methylpyrrolidone, acetonitrile, dimethylformamide; and mixed solvents thereof.

Practically, an organic solvent is used as a poor solvent for the carrier. A reaction temperature may be selected within a range of, for example, about 20 to 250° C.

The reaction of a reactive group of the carrier (A) (or the reactive group introduced to the carrier (A) by the compound (B)) with the hydrophilic or hydrophobic compound (D) may be conducted in the same manner as in the reaction of the reactive group of the carrier (A) with the functional group of the compound (C). The amount of the hydrophilic or hydrophobic compound (D) can be selected from the ranges of, for example, about 0.5 to 5 mole, preferably about 0.7 to 3 mole, more preferably about 1 to 2 mole of the reactive group of the compound (D) relative to 1 mole of the reactive group of the carrier (A) (or the reactive group introduced to the carrier (A). The proportion by weight of the compound (D) can not be determined precisely because of its dependence on the molecular weight of the compound (D), and may be, for example, about 0.01 to 200 parts by weight, preferably about 0.02 to 150 parts by weight, more preferably about 0.05 to 100 parts by weight relative to 100 parts by weight of the carrier (A).

Each reaction described above can be usually conducted with stirring in an inert atmosphere such as nitrogen, helium, argon. After these reactions, reactive particles can be obtained, if necessary, by the conventional methods such as filtration, washing, concentration, drying.

To the carrier particle of the reactive particle of the present invention, a functional group is introduced, and the reactive particle has a number of active sites. Therefore, such reactive particles can function effectively as a crosslinking agent, carrier, etc., even in small amounts. Further, even these particles are ultra-fine particles having a extremely small mean particle size, they have high activity.

INDUSTRIAL APPLICABILITY

The reactive particle of the present invention, according to the species of the carrier or functional group, and particle size, can be utilized for various purposes, for example, as a filler for a resin, a resin compound, or a coating material, an additive or a crosslinking agent, a viscosity-control agent utilizing their reactivity, a resist material to which a functional group of high reaction activity or a polymerizable unsaturated group is introduced, a carrier for supporting a medicine such as a biologically active component, an additive for a cosmetic. Moreover, the reactive particle of nanometer (nm) order can be used as a carrier for diagnosis by utilizing its high activity.

EXAMPLES

The following examples are intended to describe this invention in further detail and should by no means be interpreted as defining the scope of the invention.

Example 1

A carboxymethyltriethoxysilane 5.6 g (manufactured by Chisso Corporation, SIC2264.5) and silicon dioxide fine particles (colloidal silica or organosilica sol) 5 g (manufactured by Nippon Aerogel, Aerogel 200, a mean particle size of 12 nm) were added to a mixed solvent of ethanol/water (95/5 (%)) of 100 ml (adjusted to pH 5 with acetic acid), then stirred at a room temperature for 8 hours. After stirring, the treated particulates were centrifuged, washed with ethanol twice, then heated to dryness at 100° C.

After dispersing 5 g of the dry treated particulates in 100 ml of a tetrahydrofuran, 2.9 g of a 2,2'-(1,3-phenylene)-bis (2-oxazoline) (manufactured by Takeda Chemical Industries Ltd., 1,3-BPO) was added to the dispersion, and then heat-refluxed for 4 hours. After completing the reaction, the reactive particles were centrifuged, washed with tetrahydrofuran three times, then dried under reduced pressure at a room temperature. The reflection infrared absorption of the dried particulates was measured with FT-IR (manufactured by Nippon Bunko, Ltd., FT/IR-7000), and the absorption derived from the oxazoline ring was observed at 1650 cm$^-$ while the absorption at the position near to 1720 cm$^-$ derived from the carboxylic acid was hardly observed. Therefore, the introduction of the oxazolinyl group to the surface of the aerogel particle was confirmed.

Example 2

A n-hexyltrimethoxysilane 1.4 g [manufactured by Chisso Corporation, H7334], a carboxymethyltriethoxysilane 2.8 g [manufactured by Chisso Corporation, SIC2264.5] and silicon dioxide particles (colloidal silica or organosilica sol) 5 g (manufactured by Nippon Aerogel, Aerogel 200, a mean particle size of 12 nm) were added to 100 ml of a mixed solvent of ethanol/water (95/5(%)), and then stirred at a room temperature for 8 hours. After stirring, the treated particles were centrifuged, washed with ethanol twice, and then heated to dryness at 100° C.

After dispersing 5 g of the dry treated particles in 100 ml of a tetrahydrofuran, 2.9 g of a 2,2'-(1,3-phenylene)-bis(2-oxazoline) (manufactured by Takeda Chemical Industries, Ltd., 1,3-BPO) was added to the dispersion, and then heat-refluxed for 4 hours. After completing the reaction, the reactive particles were centrifuged, washed with tetrahydrofuran three times, and then dried under reduced pressure at a room temperature. The reflection infrared absorption of the dried particulates was measured with FT-IR (manufactured by Nippon Bunko, Ltd., FT/IR-7000), and the absorption derived from the oxazoline ring was observed at 1650 cm$^-$ while the absorption at the position near to 1750 cm$^-$ derived from the carboxylic acid was hardly observed. Therefore, the introduction of the n-hexyl group and the oxazolinyl group to the surface of the aerogel particle was confirmed.

Example 3

A trisodium citrate dehydrate 14 g and a ferrous sulfate heptahydride 7.5 g were dissolved in 60 ml of a distilled water, then 25 ml of an aqueous solution containing 2.5 g of a silver nitrate was added to the solution. The produced precipitate is centrifuged, then dispersed in 500 ml of distilled water to prepare a dispersion of silver particles. When 2 ml of a mercaptoethanol was added to this dispersion, a black precipitate was produced. The produced precipitate was recovered by centrifuging, dried, and then dispersed in a tetrahydrofuran. After adding 3 g of a 2,2'-(1,3-phenylene)-bis(2-oxazoline) (manufactured by Takeda Chemical Industries, Ltd., 1,3-BPO), the mixture was subjected to a reaction under heating reflux for 5 hours. As a result, a dispersion of silver particles each having an oxazoline group on its surface was obtained.

Example 4

Silicon dioxide particles 10 g [manufactured by Nippon Aerogel, Ltd., a mean particle size of 12 nm] was dispersed in 1000 ml of an ethyl alcohol [manufactured by Nakaraitesuku, Ltd.] with stirring. To the dispersion, 12.1 g of a γ-glycidoxypropyltrimethoxysilane [manufactured by Toray.Dow Corning Silicone, Ltd., SH6040] was added, then the mixture was subjected to a reaction under reflux for 8 hours. After cooling the reaction mixture, the particles were centrifuged, washed sufficiently with tetrahydrofuran, then dried under reduced pressure. 5.4 g of a 1,10-diaminodecane [manufactured by Aldrich Chemical Company, Inc.] was added to the dry treated particulate substances, then the mixture was subjected to a reaction at 200° C. for 30 minutes. As a result, the particulate reactive particles each having an amino group on its surface were obtained.

Example 5

Carbon black particles 10 g (manufactured by Mitsubishi Chemical, Ltd., a mean particle size of 18 nm) were dispersed in 1000 ml of an ethyl alcohol [manufactured by Nakairaitesuku, Ltd.] with stirring. To the dispersion, 4.6 g of a 2,2'-(1,3-phenylene)-bis(2-oxazoline) (manufactured by Takada Chemical Industries, Ltd., 1,3-BPO) was added, and the mixture was subjected to a reaction under reflux for 8 hours. After cooling the reaction mixture, the particles were centrifuged, washed sufficiently with tetrahydrofuran, then dried under reduced pressure. As a result, the particulate reactive particles each having an oxazolinyl group on its surface were obtained.

What is claimed is:

1. A reactive particle represented by the following formula:

wherein A is a carrier particle, C is an organic group having at least one free functional group selected from the group consisting of an oxazoline group, a cyclic ester group, a cyclic ether group, an isocyanate group, a hydroxyl group, a mercapto group, a carboxyl group, an acid anhydride group, an ester group, an amino group, a formyl group, a carbonyl group, a vinyl group, a hydroxsilyl group, an alkoxysilyl group, a halosilyl group, a hydrosilyl group, D is a hydrophilic or hydrophobic organic group selected from the group consisting of (1) alkyl groups, (2) aryl groups, (3) aralkyl groups, (4) heterocyclic groups, (5) organic groups selected from an alkyl group, an aryl group, an aralkyl group and a heterocyclic group, having at least one bond selected from the group consisting of an amide bond, an urethane bond, an urea bond and an ester bond, (6) polyoxyalkylene groups and (7) saccharic residues, B1 is an organic group connecting said carrier particle A and said organic group C, B2 is an organic group connecting said carrier particle A and said hydrophilic or hydrophobic organic group D, said organic groups B1 and B2 are residues of a compound having at least one reactive group selected from the group consisting of hydroxyl group, a mecapto group, a formyl group, an alkylcarbonyl group, a carboxyl, an acid anhydride group, an ester group, a cyclic ester group, a cyclic ether, an amino group, an isocyanate group, an oxazoline group, a vinyl, condensable or hydrolyzable organic silicon, n is an integer of not less than 1, m and p are 0 or 1, q is an integer of not less than 1, m and p may vary in accordance with n and q.

2. A reactive particle according to claim 1, wherein said carrier particle A is an organic or inorganic particle.

3. A reactive particle according to claim 1, wherein said carrier particle A is a particle comprising at least one member selected from the group consisting of a polymer, a metal, a carbon, a metal compound and a ceramic.

4. A reactive particle according to claim 1, wherein the mean particle size of said carrier particle A is in a range of 1 nm to 100 $\mu$m.

5. A reactive particle according to claim 1, wherein a compound forming the organic group C is a bisoxazoline compound represented by the following formula:

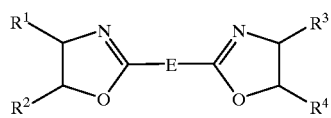

wherein E represents an alkylene group which may have a substituent, a cycloalkylene group which may have a substituent or an arylene group which may have a substituent; $R^1$, $R^2$, $R^3$ and $R^4$ are the same or different, each representing a hydrogen atom, an alkyl group which may have a substituent or an aryl group which may have a substituent.

6. A reactive particle according to claim 1, wherein the organic groups B1 and B2 are residues of a silane coupling agent having at least one reactive group selected from a halogen atom, a hydroxyl group, a mercapto group, a carboxyl group, an amino group, an expoxy group, an isocyanate group, a vinyl group and a (meth) acryloyl group.

* * * * *